(12) United States Patent
Klotz (10) Patent No.: US 8,276,722 B2
(45) Date of Patent: Oct. 2, 2012

(54) REPEATING LATERAL TRANSVERSE SUPPORT FOR AT LEAST ONE LATERAL ELECTRIC POWER SUPPLY PROFILE AND FOR THE GUIDE RAIL OF AN ELECTRICALLY POWERED GUIDE ROAD VEHICLE

(75) Inventor: Martin Klotz, Gresswiller (FR)

(73) Assignee: Lohr Industrie, Haganbieten (FR)

( * ) Notice: Subject to any disclaimer, the term of this patent is extended or adjusted under 35 U.S.C. 154(b) by 138 days.

(21) Appl. No.: 12/677,948

(22) PCT Filed: Sep. 12, 2008

(86) PCT No.: PCT/FR2008/001277
§ 371 (c)(1),
(2), (4) Date: Mar. 12, 2010

(87) PCT Pub. No.: WO2009/092869
PCT Pub. Date: Jul. 30, 2009

(65) Prior Publication Data
US 2010/0307880 A1    Dec. 9, 2010

(30) Foreign Application Priority Data
Sep. 13, 2007    (FR) ..................................... 07 06428

(51) Int. Cl.
*B60M 1/30* (2006.01)
(52) U.S. Cl. ......................................... 191/32; 238/282
(58) Field of Classification Search .................. 104/139, 104/140, 194, 242–244; 191/6, 14, 22 R, 191/25, 28, 29 R, 30, 32, 48; 238/122, 282, 238/287, 288, 306, 338, 342, 343
See application file for complete search history.

(56) References Cited

U.S. PATENT DOCUMENTS

| 3,735,845 A | 5/1973 | Harmsen |
| 3,923,245 A * | 12/1975 | Marchant ..................... 238/347 |
| 6,250,442 B1 | 6/2001 | Perraud et al. |
| 7,748,509 B2 * | 7/2010 | Donnard ......................... 191/25 |
| 2005/0001048 A1 | 1/2005 | Skoblenick et al. |
| 2008/0105509 A1 | 5/2008 | Donnard |

FOREIGN PATENT DOCUMENTS

| DE | 2920550 A1 | 12/1980 |
| DE | 20117180 U1 | 12/2001 |
| EP | 0745505 A1 | 12/1996 |
| FR | 2 762 810 A | 11/1998 |
| FR | 2 875 751 A | 3/2006 |
| WO | 93/17891 A1 | 9/1993 |
| WO | 00/53449 A1 | 9/2000 |

* cited by examiner

Primary Examiner — S. Joseph Morano
Assistant Examiner — Zachary Kuhfuss
(74) Attorney, Agent, or Firm — Davis & Bujold, PLLC (57) ABSTRACT

The repeating transverse support is either a one-branch or a two-branch (15, 16) sleeper which is pressed against the bed plate (8) by elements which secure the directional guide rail (2). The terminal ends of this sleeper, which are in the form of mounting plates (23, 24), each support an electrical power supply lateral profile (33, 34) by way of an electrical insulator (27, 28) and an adjustment member. This repeating transverse support is of interest to the manufacturers of tracks for electrically powered guided road vehicles.

12 Claims, 7 Drawing Sheets

REPEATING LATERAL TRANSVERSE SUPPORT FOR AT LEAST ONE LATERAL ELECTRIC POWER SUPPLY PROFILE AND FOR THE GUIDE RAIL OF AN ELECTRICALLY POWERED GUIDE ROAD VEHICLE

This application is a national stage completion of PCT/FR2008/001277 filed Sep. 12, 2008 which claims priority from French Application Serial No. 0706428 filed Sep. 13, 2007.

FIELD OF INVENTION

The present invention relates to a repeating transverse support for at least one lateral electric supply profile and for the guide rail for an electrically powered road vehicle that is directionally guided along a median ground rail.

The repeating support according to the present invention comprises one branch or two segments or an arc which is pressed against the ground below the corresponding guide rail fastening element for which it serves as a contact and underneath which it is attached to the bed plate using the local element fastening the guide rail.

BACKGROUND OF THE INVENTION

Attaching the lateral electric energy supply profiles for a vehicle is conventionally accomplished by mounting each electrically charged profile inside an attaching support using electrically insulating blocks. These supports are attached at regular intervals to the adjacent wall, for example, by bolting them in succession to posts serving as supports and keeping the supply profile above ground.

Patent Application No. EP 0745505 in the name of REHAU discloses, for example, an electrically insulating support for electric contact rails composed of a foot with a support arm for a contact rail comprising support and retaining beds for the rail that are attached using a non-metal attaching element.

PCT Application No. WO 00/53449 in the name of DAIMLER CHRYSLER describes a unit of electrical supply profiles and beams comprising an H-shaped guide beam for a vehicle transport system with an electrically insulating mounting support for an electric supply rail.

PCT Application No. WO 93/17891 in the name of WIRTHWEIN also discloses a conductive profile support composed of plastic pieces of adjustable shape that can be tightened around a conductive profile placed at a defined distance from the travel rail, with the support for the conductive profile and the rail resting on the sleepers.

In addition, Patent Application No. FR 2.875.751 of LOHR INDUSTRIE describes a ground electric supply system for a guided urban transport vehicle in which low voltage linear supply conductors are placed in a channel that is open at the top on either side of a central guide rail having a zero volt reset strip on each side.

In this device two side profiles with their exterior surfaces set in the concrete channel base extend longitudinally on either side of the central rail.

The linear supply conductors are held by a series of brackets and further surrounded and concealed by protective horizontal L-shaped profiles located above them. The brackets, like the protective profiles, are screwed into the side profiles and the screw nuts set in the concrete.

No means of adjusting the supply conductors is provided. The unit is set solidly in the concrete and there is no adjustment possible other than orienting the conductors or the distances of the conductors relative to one another or to the central rail.

Generally speaking, these different prior art systems comprise many constituent elements, which makes manufacturing and installation expensive.

Additionally they are not immobilized on the ground using rail attachments, in particular, central guide rail attachments.

SUMMARY OF THE INVENTION

The goal of the present invention is on the one hand, to facilitate placing and adjusting the relative separations and distances between the guide rail and the lateral electric supply profiles and on the other hand, to reduce installation costs in terms of installation time and time spent adjusting and attaching both the components and fastening elements.

Another goal of the invention is to facilitate distance regulation and position recovery between the two electric supply profiles and between the profiles and the median guide rail.

An important feature of the invention is that it saves installation and adjustment time as well as reducing the number of constituent elements.

This is achieved through the use of a repeating transverse support along a track traveled by a guided road vehicle for the lateral electric supply of the road vehicle using an electrically charged lateral profile through a median directional guide rail mounted on a bed plate characterized by having a transverse support that attaches to the bed plate by means of the attaching element on the directional guide rail and which is in the form of a sleeper, the terminal extremities of which each support an electrical power supply lateral profile using an electrical insulator and a means for mechanically adjusting orientation and distances.

BRIEF DESCRIPTION OF THE DRAWINGS

Other characteristics and features of the invention will be apparent from reading the following detailed description with reference to the attached drawings, in which.

DETAILED DESCRIPTION OF THE PREFERRED EMBODIMENTS

The invention falls into the realm of guide and supply tracks for guided road vehicles powered by electrical energy.

A guide and electric supply track 1 comprises a central guide rail 2 upon and along which pass two angled guide rollers 3,4 on a guide assembly (not shown) of a road vehicle, that is, an electrically powered vehicle on tires.

Guide rail 2 is attached to the ground by its foot 5 using elements such as bolts 6 and 7 anchored to bed plate 8. These bolts are designed to immobilize the position of adjustable rail attachment elements on the right 9 and left 10 of the rail. These rail attachment units each consist of a transverse immobilizing piece 11 or 12 covered with a maintenance piece 13 or 14, respectively, that is adjustable in position, the extremity of each one bearing upon the corresponding side of cushion 5 of guide rail 2 to immobilize it.

Obviously the invention is not limited to a guide assembly with two angled rollers, but on the contrary, applies to any ground rail guided vehicle.

Guide rail 2 bears locally on one or more transverse elements called sleepers, for example, plates 15 or 16, the extremities of which are joined on bed plate 8.

The sleepers 15 or 16 are the mechanical base elements for left and right supports 17 and 18 for the lateral electric supply profiles. Their left extremities 19 and right extremities 20 face each other.

The sleepers are pressed against the ground by foot 5 and immobilized by the adjustable attachments on guide rail 2 which crosses over them.

For this purpose, the left or right extremities 19 or 20 on sleepers 15 or 16 have enlarged openings 21, 22, respectively, near their juncture which may be oblong for the passage of bolts 6 and 7 which are anchored to the ground.

Flat sleepers 15 and 16 are followed by a level area, that is, an area that contacts bed plate 8, each terminating in an end plate 23 or 24, respectively, raised up by an ascending ramp 25 or 26, each ramp defined by two transverse angles.

According to a first embodiment, on each end plate 23, 24 a vertical electric insulator 27 or 28 is attached, having flanges that support a square plate 29 or 30 that is attached to the upper extremity of the corresponding electric insulator 27 or 28 with a screw for adjusting orientation. There is attached to square plate 29 or 30, preferably also adjustably, a claw-like or clamping element 31 or 32 for gripping the base of a lateral electric supply linear profile 33 or 34, for example, an I-shaped profile. The front of each of these lateral electrical supply linear profiles 33 or 34 is equipped with a conductive groove 35 or 36 each having a planar longitudinal front surface 37 or 38 forming a pathway for a shoe, for example, a shoe designed to continuously capture the electrical power supply (not shown).

Figure 1:
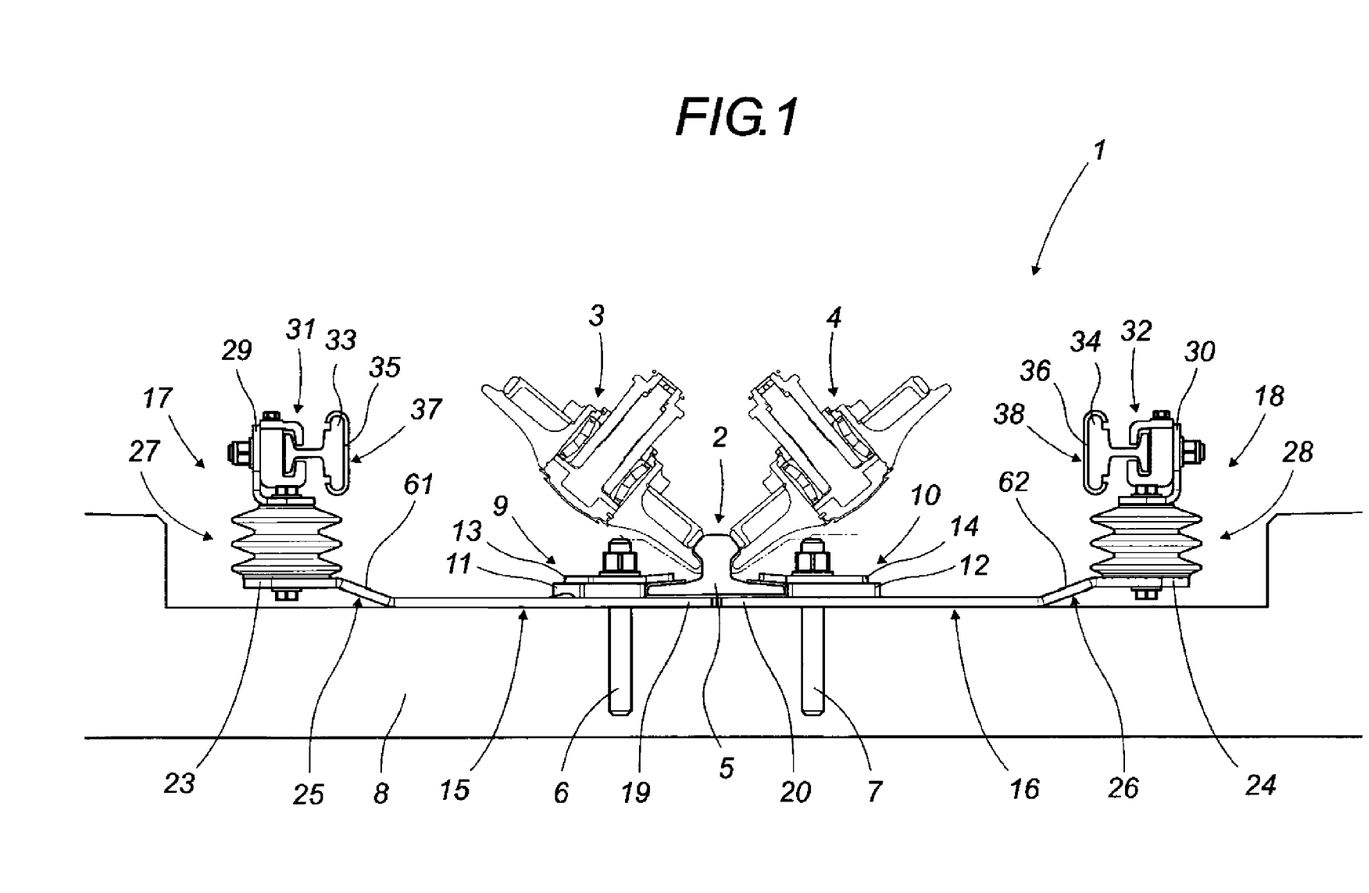
FIG. 1 is a front view of a guide and supply track comprising the repeating lateral support according to a first embodiment with a vertical electrical insulator.

The electric supply support for one side has been described. In the majority of cases, as shown in FIG. 1, an identical supply unit exists on the other side, even in a simplified embodiment where a single sleeper 15 or 16 supports a single lateral electric supply profile.

Figure 4:
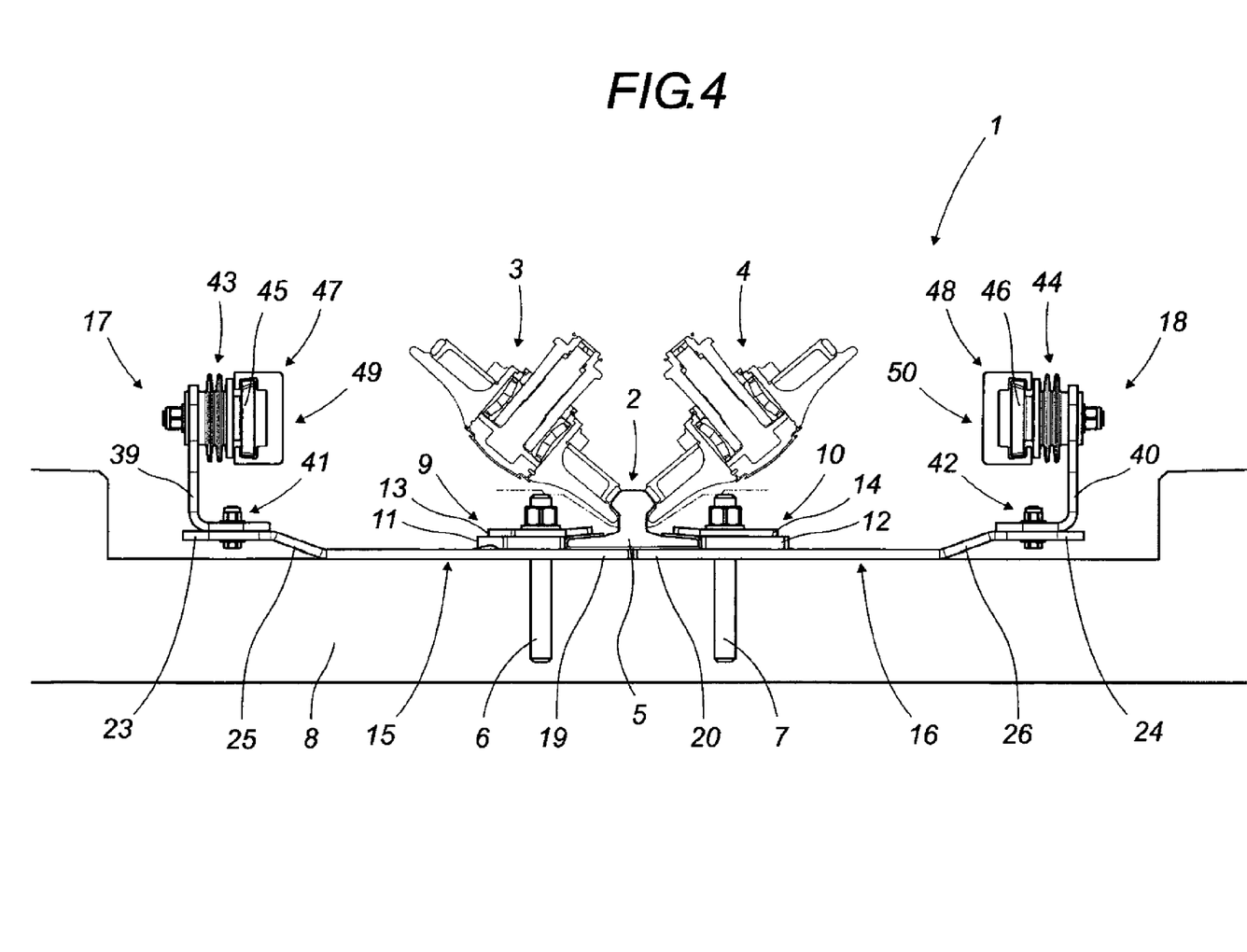
FIG. 4 is a front view of a guide and supply track with the repeating transverse support according to a second embodiment with a horizontal electrical insulator.
Figure 5:
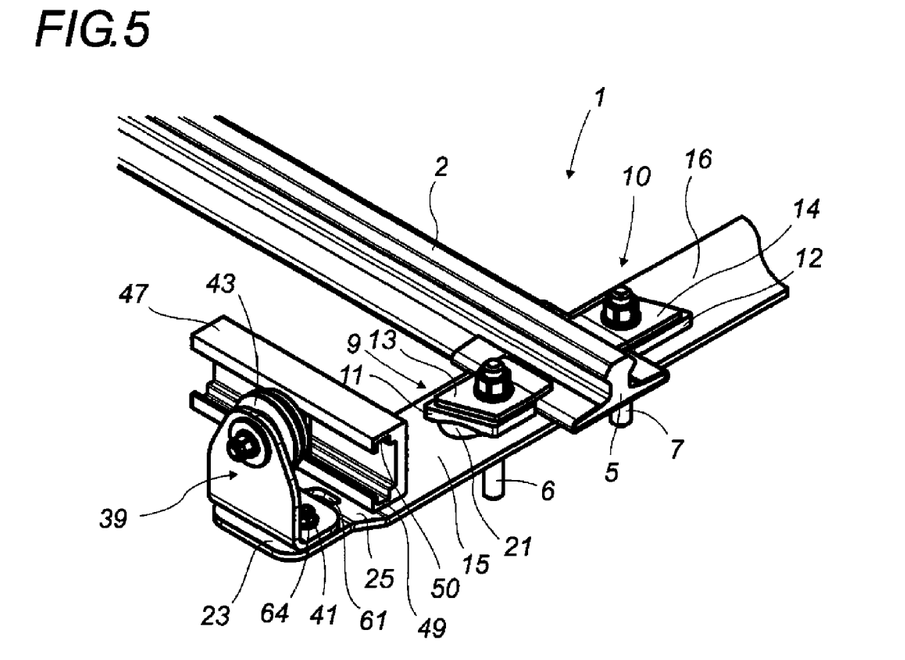
FIGS. 5 and 6 are perspective views from two different angles showing a portion of the guide track with the repeating transverse support comprising one lateral electric supply side and the guide rail.
Figure 6:
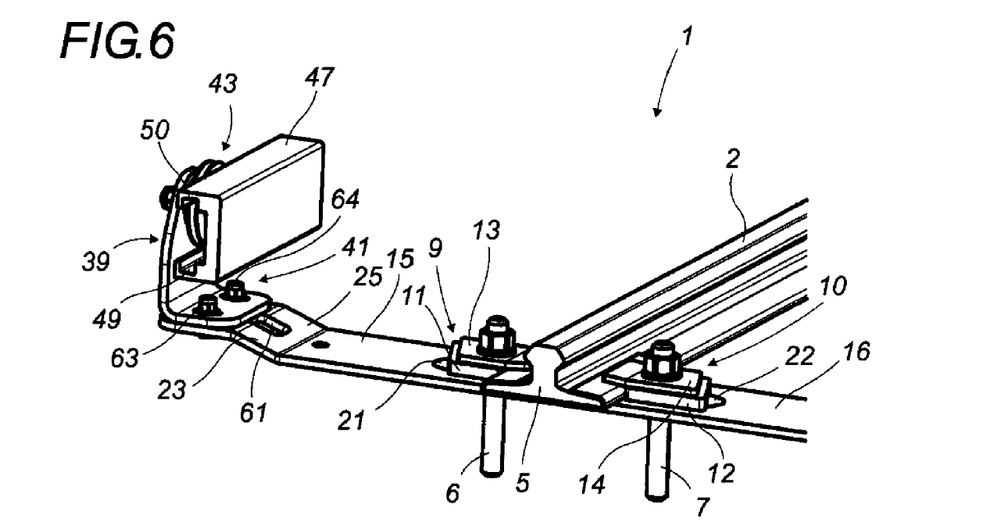

According to another embodiment shown in FIGS. 4 through 6, the two sleepers 15 and 16 are also identical in their general definition. In this case, end plates 23 or 24 directly support an inverse square plate 39 or 40, with its lower plane portion attached with allowance for play to the corresponding end plate 23 or 24, respectively, by two assemblies 41 or 42, for example, bolts or the like for adjusting position and orientation. The upright portion of square plate 39 or 40 holds a flanged horizontal electric insulator 43 or 44.

The extremity of the body of each electrical insulator 43 or 44 is shaped like a frontal plate or disc 45 or 46 engaging corresponding lateral electric supply profile 47 or 48 with a sideways U-shaped section. Each plate or disc engages the electric supply profile by its opposing edges or two opposing border areas in two opposing grooves 49 and 50 with rectangular bases to support it while allowing it to slide for longitudinal adjustment. Its front surface is used as before as a pathway for a contact shoe acting as an electrical energy accumulator (not shown).

Figure 7:
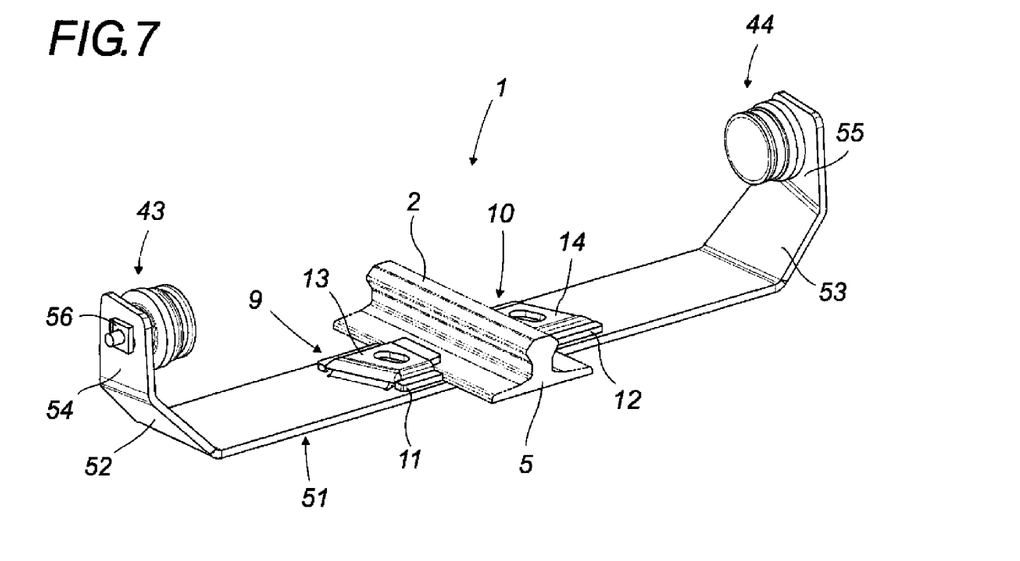
FIGS. 7 and 8 are illustrative views respectively showing in perspective and in transverse cross-section a guide and electrical supply track with the repeating transverse support according to a simplified embodiment.
Figure 8:
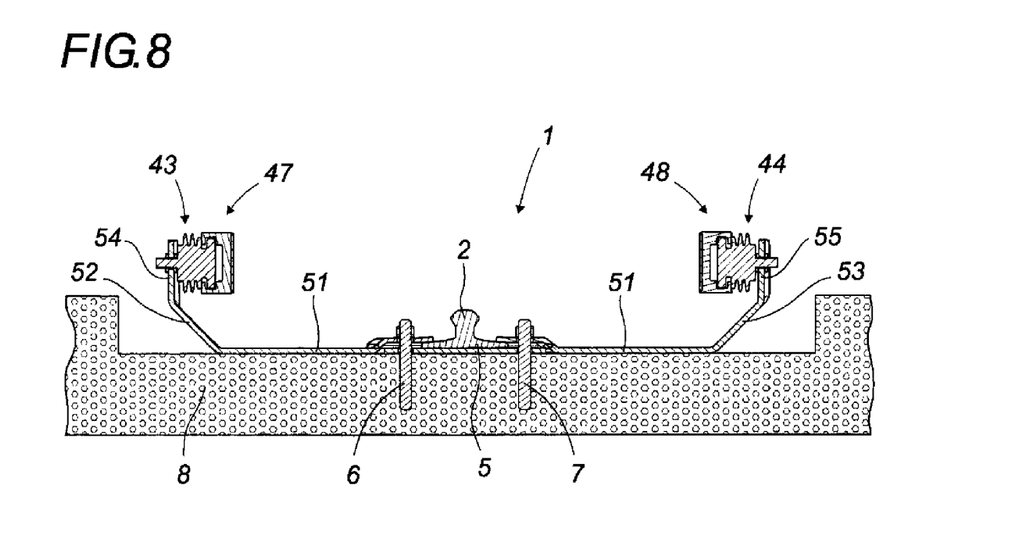
Figure 9:
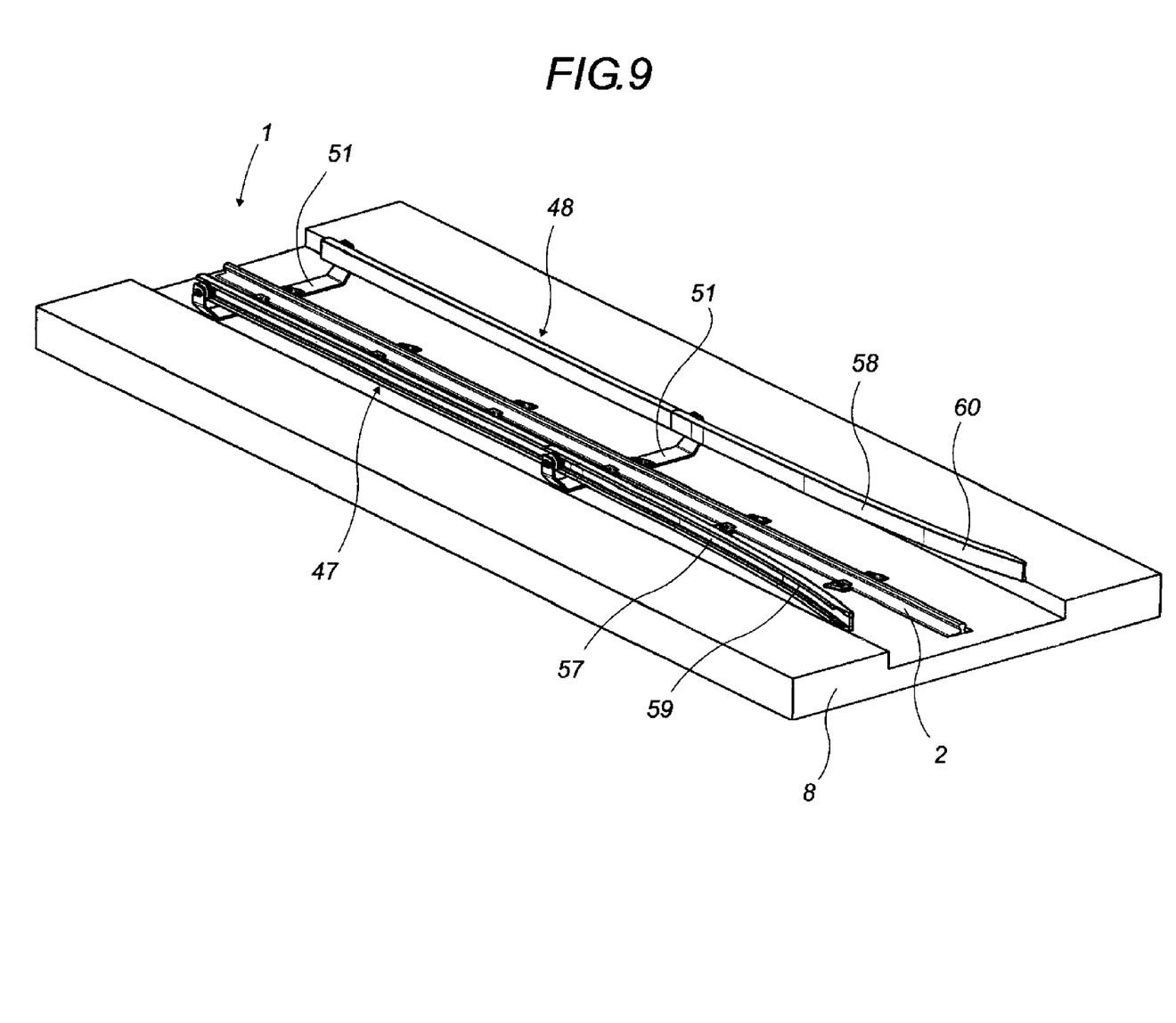
FIG. 9 is a perspective of one example of configuring the tack at the entry to or exit from the circuit.

Another embodiment shown in FIGS. 7, 8 and 9 consists of providing on foot 5 of guide rail 2 a transverse support or sleeper 51 that may be flat and made of a single piece, the central portion of which serves as a base plate for foot 5, the central portion being traversed by local attachments 6 or 7 on guide rail 2.

Figure 10:
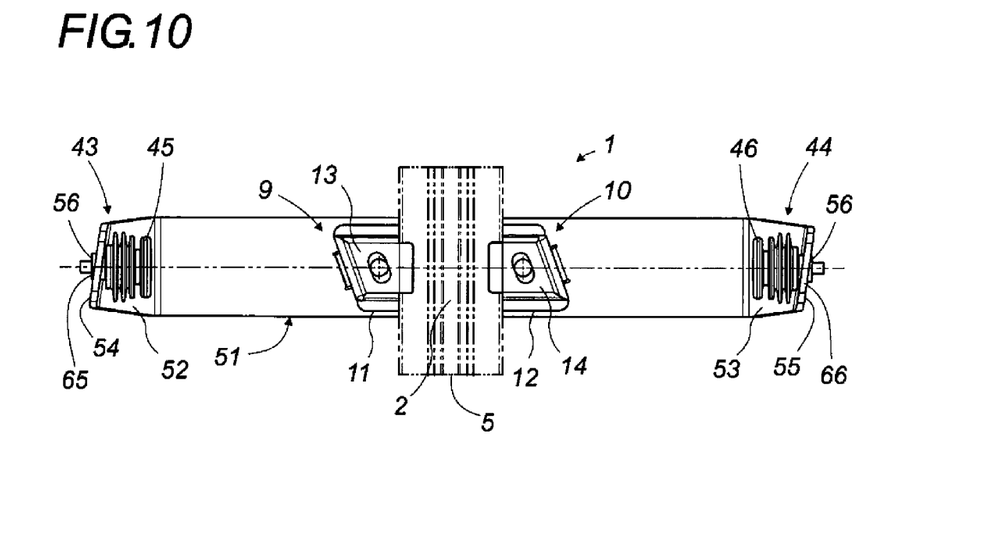
FIG. 10 is a plane view of the track portion with the repeating transverse support the same as in the embodiments in FIGS. 7 and 8, but without an electrical supply profile.
Figure 11:
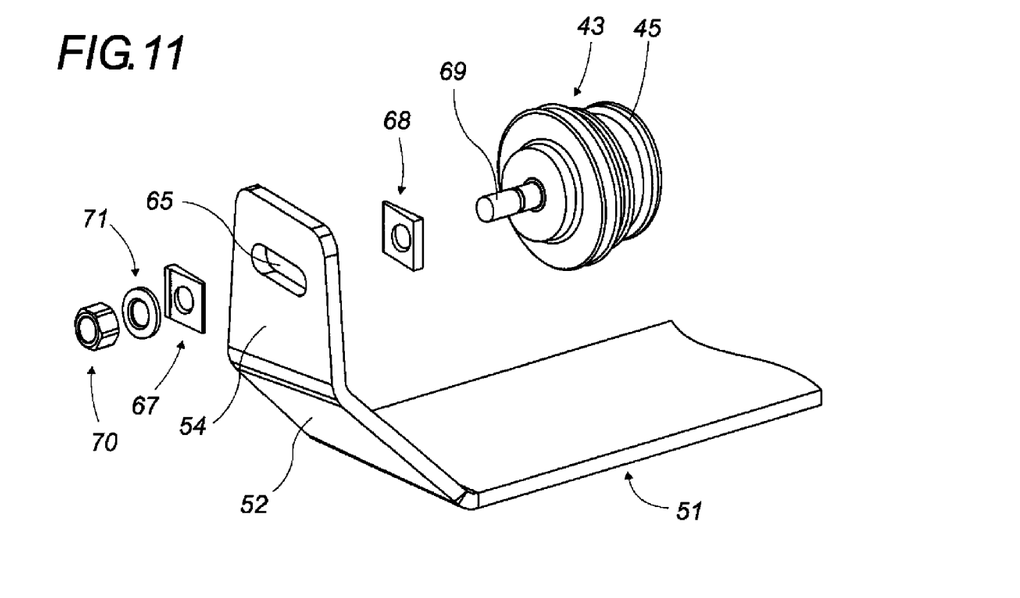
FIG. 11 is an exploded perspective view showing the means for adjusting the distance and orientation of the electrical supply profile corresponding to the variation in FIGS. 7 and 8.

This transverse support 51 or sleeper is a flat transverse support generally arched in shape with raised extremities, for example, with a portion angled to form an inclined ramp 52 or 53 and with a terminal plate 54 or 55 obliquely oriented relative to the longitudinal axis of the track as shown in FIGS. 7, 10 and 11.

In each case the support holds at each terminal plate 54 or 55 a horizontal electrical insulator 43 or 44, respectively, on the front portion of which there is slidably attached an electrically charged profile 47 and 48 as in the preceding embodiment.

A portion of the trajectory of the guided road vehicle may be formed by attaching a succession of several simple guide rails 2 replaced at longer or shorter intervals by attachments bearing on one of the flat transverse supports described above comprising at each of its raised extremities a horizontal insulator 43 or 44 receiving a lateral electrical supply profile 47 or 48, respectively.

Insulators 43 or 44 are attached so as to be adjustable in position after guide rail 2 has been set so as to maintain the functional distance necessary to supply electricity to the vehicle as it passes and ensure proper positioning of the profile serving as a grooved electricity supply.

Adjustments take place by means of the combination of diagonal wedges such as wedge 56 with the oblique orientation of terminal plates 54 and 55.

FIG. 9 is a schematic representation of an arrangement at the outlet or inlet of a circuit.

The lateral electric supply profiles have at their extremity a portion 57 or 58 with a portion that is curved toward the exterior 59 or 60 so as to form an engagement or disengagement zone allowing entry into the electrified circuit or egress for an outside intervention, for example, or placing it in reserve or some other state. The electrical energy harnessing shoes make progressive contact with the electrified profiles.

Two exemplary embodiments of the means for adjusting distance and orientation are shown in the drawings.

Figure 2:
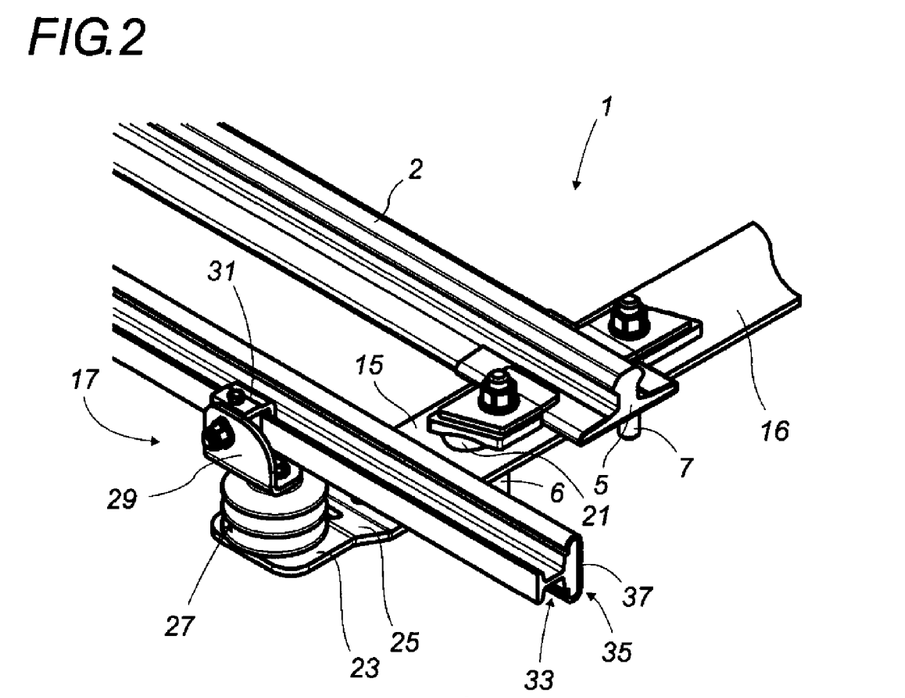
FIGS. 2 and 3 are perspective views from two different angles showing a portion of the guide track with the repeating lateral support comprising one lateral electric supply side and the guide rail.
Figure 3:
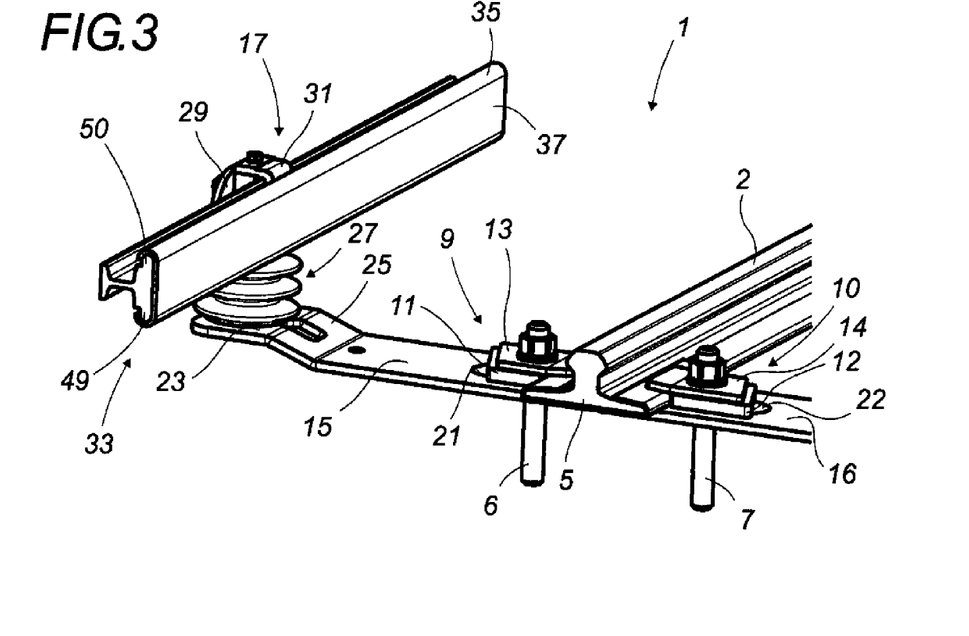

First, for the embodiment shown in FIGS. 1, 2, and 3, the means for adjusting distance and orientation takes the form of a slot 61 and 62 transverse to the axis of the track, generally rectangular, on at least the large portion of each respective end plate 23 and 24 along which the threaded rod extremity of insulator 27 or 28 is displaced and immobilized by an attachment means, for example, a screw 63 and 64, each exerting immobilizing pressure through a washer.

This means constitutes the transverse regulation that allows the rail to be adjusted relative to the track axis.

The means is completed by square plate 29, 30, one of which serves as the adjustable attachment means for orienting the electricity supply rail. This square plate 29, 30, one of which is easily visible in its entirety in FIG. 2, can be immobilized in an adapted angular position after being slightly pivoted around the fixation point on its base, using a screw, for example.

The combination of the two movements above, one transverse to the longitudinal track axis along slot 61 or 62 and the other a pivoting movement, regulates distance and recovers position for centering and regulating orientation in order to maintain the linear electrical supply structures in parallel.

According to another variation shown in FIGS. 4, 5 and 6, each linear electrical supply structure is supported by a square plate 39, 40 attached to the corresponding end plate. The connection with each electric supply profile 47 or 48 is effected through a horizontal electrical insulator 43, 44 with a slidably mounted front plate 45 or 46 sliding within a corresponding groove on the electrical supply profile and attached at the rear to the upper portion of the square plate.

For the last variation shown in FIGS. 7 and 8, each horizontal insulator 43 or 44 supports conductive profile 47 or 48 in the same way by a front plate 45 or 46 cooperating with a groove formed in the rear surface of the rail. Each insulator is attached to the corresponding terminal plate so as to be adjustable in distance and orientation using a system of diagonal wedges in an oblong longitudinal opening 65 and 66 located in each oblique terminal plate 54, 55 allowing central rail 2 to be moved closer or farther away.

FIG. 11 is a detailed exploded perspective view. This drawing clearly shows the regulating or adjustment means based on the combined use of two diagonal wedges 67 and 68 on either side of terminal plate 54 and 55 together with the oblique disposition of these terminal plates. Near oblong opening 65, 66 these wedges are traversed by the end of a rod 69 integral with the insulator body supporting the conductive electrical supply profile.

Diagonal wedges 67 and 68 are angled wedges, that is, their two principal surfaces converge.

They are traversed by rod 69 of insulator 43, 44 which also traverses oblong opening 65, 66. The unit is tightened by a screw 70 and contact washer 71.

The slight angle of each terminal plate 54 and 55 is neutralized by the diagonal wedges, allowing insulator 43, 44 to be maintained in alignment relative to the transverse local track axis.

Because of diagonal wedges 67 and 68, the insulator can be displaced along oblong opening 65, 66 while still remaining parallel to the transverse axis of the track. This displacement constitutes a regulating displacement that allows insulator 52, 53, which also serves as a support for the electrical supply rail, to be slightly displaced closer to or farther from central guide rail 2 while adopting an adaptive orientation.

This adjustment capability constitutes an important feature of the invention.

The invention claimed is:

1. A repeating transverse support, for a directional central guide rail (2) and for either one or two lateral linear electrical supply structures, for guiding a road vehicle traveling along a track defined by the lateral electric supply structures,
    the central directional guide rail (2) being supported at successive intervals by the repeating transverse support along a course and across which the central directional guide rail (2) being attached to a bed plate (8),
    the transverse support being a sleeper (15, 16 or 51) on which a foot (5) of the central guide rail (2) abuts and the sleeper being attached to the bed plate (8) such that the sleeper is adjustable with respect to the guide rail (2),
    the sleeper having either one or two terminal extremities, and each of the one or two terminal extremities is attached to a maintenance means which supports a linear electric supply structure via an individual electric insulator,
    a mechanical means for adjusting an orientation, a distance and a position of the linear electric supply structure relative to the central guide rail (2),
    anchor elements (6, 7) for attaching and anchoring the guide rail (2), each respective rail attachment and the sleeper to the bed plate (8) in such a way that the position of the sleeper relative to the anchor elements (6, 7) is adjustable, and
    each of two insulators (27, 28) is vertical and attached to an end plate (23, 24), and each of the two insulators supporting an adjustable support that holds a respective lateral electric supply profile (47, 48).

2. The support according to claim 1, wherein the anchor elements (6, 7) respectively traverse a right adjustable rail attachment (9) and a left adjustable rail attachment (10) for regulating a position of the central guide rail (2), and the right and the left adjustable rail attachments each engage with the sleeper.

3. The support according to claim 1, wherein the anchor elements (6, 7) are bolts for immobilizing a left adjustable rail attachment (9) and a right adjustable rail attachment (10), the left and the right adjustable rail attachments (6, 7) each comprise a transverse immobilizing piece (11, 12), respectively, which is covered by a maintenance piece (13, 14) that is adjustable, and an extremity of each of the maintenance pieces (13, 14) bears on a corresponding side of the foot (5) of the guide rail (2) for immobilizing the guide rail (2).

4. The support according to claim 1, wherein the sleeper is made as a single branch (51) that extends laterally on both sides of the central guide rail (2).

5. The support according to claim 1, wherein the sleeper is made as two branches (15, 16).

6. The support according to claim 5, wherein portions of the two branches (15, 16), in a vicinity of the rail, are traversed by the corresponding attaching element (6, 7) on the guide rail (2) and another extremity of each of the two branches (15, 16) is connected to the electrically charged profile, via an insulating electric block (43, 44), by an adjustment means.

7. The support according to claim 1, wherein the sleeper is made as a single branch and the single branch extends laterally only on a single side of the central guide rail (2).

8. The support according to claim 7, wherein the flat sleeper comprises two portions (15, 16) arranged end to end, and each portion terminates in an end plate.

9. The support according to claim 1, wherein the sleeper is a single flat sleeper (51) made as one piece that extends into upright extremities, and each upright extremity is a plate.

10. The support according to claim 1, wherein each insulator (27 or 28) is attached to an end plate (23 and 24) by an attachment that is displacable before being tightened along a slot (61 or 62) which extends transverse to a longitudinal axis of the track, and each insulator supports the respective lateral electric supply profile via an adjustable support.

11. A repeating transverse support, for a directional central guide rail (2) and for at least one lateral linear electrical supply structure, for guiding a road vehicle traveling along a track defined by the lateral electric supply structures;

the central directional guide rail (2) being supported, at successive intervals, by the repeating transverse support along a course and across which the central directional guide rail (2) being attached to a bed plate (8);

the transverse support comprising a sleeper (15, 16 or 51) on which a foot (5) of the central guide rail (2) abuts, and the sleeper being attached to the bed plate (8) such that the sleeper being adjustable with respect to the guide rail (2);

the sleeper having at least one terminal extremity, and each terminal extremity being attached to a mechanism supporting a linear electric supply structure via an electric insulator;

a mechanism for adjusting an orientation, a distance and a position of the linear electric supply structure relative to the central guide rail (2); and anchor elements (6, 7) for attaching and anchoring the guide rail (2), each respective rail attachment and the sleeper to the bed plate (8) such that the position between the respective anchor elements (6, 7) and the sleeper being adjustable;

wherein each of two insulators (43, 44) is held horizontally by a plate (39, 40) which is adjustably attached to an end plate, and each of the insulators (43, 44) comprises a front plate portion to which a lateral electric supply profile (47, 48) of the linear electric supply structure is attached.

12. A repeating transverse support, for a directional central guide rail (2) and for at least one lateral linear electrical supply structure, for guiding a road vehicle traveling along a track defined by the lateral electric supply structures;

the central directional guide rail (2) being supported, at successive intervals, by the repeating transverse support along a course and across which the central directional guide rail (2) being attached to a bed plate (8);

the transverse support comprising a sleeper (15, 16 or 51) on which a foot (5) of the central guide rail (2) abuts, and the sleeper being attached to the bed plate (8) such that the sleeper being adjustable with respect to the guide rail (2);

the sleeper having at least one terminal extremity, and each terminal extremity being attached to a mechanism supporting a linear electric supply structure via an electric insulator;

a mechanism for adjusting an orientation, a distance and a position of the linear electric supply structure relative to the central guide rail (2); and anchor elements (6, 7) for attaching and anchoring the guide rail (2), each respective rail attachment and the sleeper to the bed plate (8) such that the position between the respective anchor elements (6, 7) and the sleeper being adjustable;

wherein an adjustment means comprises an arrangement of two diagonal wedges (67, 68) which are used to mount a respective one of two insulators (43, 44), each one of the two insulators (43, 44) supports a lateral electric supply profile (47, 48) and is attached to a terminal plate (54, 55) via an oblong opening therein, the terminal plate (54, 55) is diagonal relative to a longitudinal axis of the track, and the terminal plate (54, 55) constitutes a corresponding upper extremity of the repeating transverse support.

* * * * *